United States Patent [19]

Abbat

[11] Patent Number: 5,257,873
[45] Date of Patent: Nov. 2, 1993

[54] ARTICULATED DOLL JOINT

[76] Inventor: Jean-Pierre Abbat, 1900 Fawndale Dr., Raleigh, N.C. 27612

[21] Appl. No.: 864,216

[22] Filed: Apr. 6, 1992

[51] Int. Cl.$^5$ .............................................. F16C 11/00
[52] U.S. Cl. ........................................ 403/59; 403/53; 403/52; 403/78
[58] Field of Search ................ 403/53, 52, 57, 59, 403/60, 56, 78, 24; 446/375, 376, 378, 383, 384

[56] References Cited

U.S. PATENT DOCUMENTS

| | | | |
|---|---|---|---|
| 292,919 | 2/1884 | Kihlgren | 446/383 |
| 703,899 | 7/1902 | Debes | 446/383 |
| 1,500,921 | 7/1924 | Bramson | 403/56 |
| 2,285,472 | 6/1942 | Tenenbaum . | |
| 2,460,880 | 2/1949 | Geizer | 403/56 |
| 2,807,119 | 9/1957 | Beebe | 403/53 |
| 3,065,566 | 11/1962 | Sugimoto . | |
| 3,277,601 | 10/1966 | Ryan | 446/378 |
| 3,319,846 | 5/1967 | Wolf | 403/329 |
| 3,361,310 | 1/1968 | Ziegler . | |
| 3,609,911 | 10/1971 | Hanf . | |
| 3,628,282 | 12/1971 | Johnson | 446/375 |
| 3,716,942 | 2/1973 | Garcia | 446/375 |
| 3,727,343 | 4/1973 | Chiari . | |
| 4,006,555 | 2/1977 | England . | |
| 4,470,784 | 9/1984 | Piotrovsky . | |
| 4,619,540 | 10/1986 | Day . | |
| 4,680,019 | 7/1987 | Baerenwald . | |

FOREIGN PATENT DOCUMENTS

| | | | |
|---|---|---|---|
| 964214 | 5/1957 | Fed. Rep. of Germany | 446/382 |
| 3302995 | 8/1984 | Fed. Rep. of Germany | 446/375 |
| 133751 | 11/1951 | Sweden | 446/383 |

Primary Examiner—Randolph A. Reese
Assistant Examiner—Anthony Knight
Attorney, Agent, or Firm—Robert G. Rosenthal

[57] ABSTRACT

An apparatus for movably connecting proximal and distal workpieces such as the limbs of a doll or mannequin is disclosed. A first shank has a first positioning means at one of its ends and a second shank has a second positioning means at one of its ends. The first positioning means and second positioning means are movably connected by means of a joint molded therearound.

11 Claims, 4 Drawing Sheets

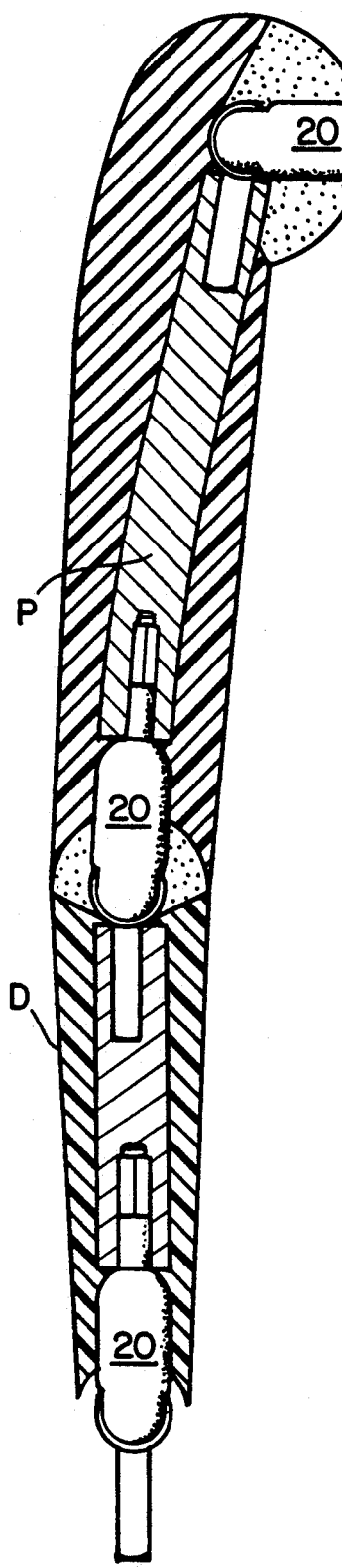
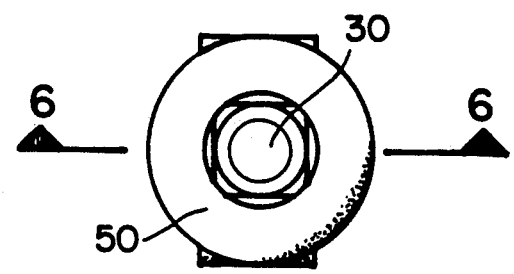
FIG. 3
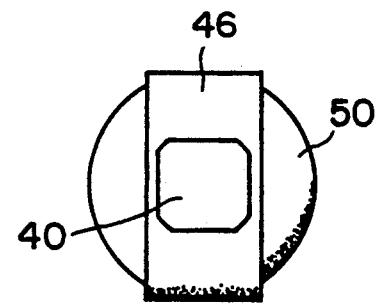
FIG. 4
FIG. 2

ARTICULATED DOLL JOINT

FIELD OF THE INVENTION

This invention relates generally to the field of joints for connecting two work pieces together and more particularly to a joint for connecting the limbs of a doll or mannequin together which permits a wider and more natural appearing selection of poses.

BACKGROUND OF THE INVENTION

Dolls and mannequins are produced with emphasis on emulating accurately specific human features such as facial characteristics, the skin and the various positions which are achievable by the human form. It is often posability that presents the most difficulty for the doll manufacturer as it is difficult to achieve a natural pose in all positions.

U.S. Pat. No. 3,716,942 to A. J. Garcia et al. discloses a limb having a rather complex tensioned, detented connector. While dolls incorporating this connector are able to be posed in many positions, they are still unable to reach all the points on a hemisphere and thus cannot be posed in a completely natural manner. In addition, it will be noted that dolls incorporating this joint employ a number of components that must be assembled by hand which results in increased cost of manufacture.

It is, therefore, an object of the present invention to provide a more naturally posable doll.

It is another object of the present invention to provide a moldable joint for use in dolls.

It is a further object of the present invention to provide a joint for use in dolls that contain a minimum number of components.

It is still a further object of the present invention to provide a joint for a doll which can be assembled quickly.

SUMMARY OF THE INVENTION

The foregoing objects are accomplished by providing an apparatus for movably connecting proximal and distal workpieces, such as the end portions of elongate limbs of a doll or mannequin. A first shank has a first end and a second end and includes a first positioning means proximate the first end and a connecting means adapted to be connected to the proximal workpiece positioned proximate the second end. A second shank has another first end and another second end and includes a second positioning means proximate the another first end and a second connecting means adapted to be connected to the distal workpiece positioned proximate the another second end. A joint means is provided for movably connecting the first positioning means and the second positioning means. The joint means forms a socket of unitary construction supporting for movement the first and second positioning means, whereby the proximal and distal workpieces are easily movable to a variety of positions.

BRIEF DESCRIPTION OF THE DRAWINGS

Some of the features and advantages of the invention having been briefly stated, others will appear from the detailed description which follows, when taken in connection with the accompanying drawings in which FIG. 1 a schematic front view partially cut away of a doll or mannequin having an internal skeleton and illustrating the joint of the present invention connecting the upper arm to the torso.

FIG. 2 is a side view of a doll or mannequin arm having an internal skeleton and illustrating the joint of the present invention used to form the wrist, elbow and shoulder joints.

FIG. 3 is an end view of the joint of the present invention showing the first positioning means.

FIG. 4 is an end view of the joint of the present invention showing the second positioning means.

DETAILED DESCRIPTION OF THE ILLUSTRATED EMBODIMENTS

While the present invention will be described more fully hereinafter with reference to the accompanying drawings, in which a particular embodiment is shown, it is to be understood at the outset that persons skilled in the art may modify the invention herein described while still achieving the favorable results of this invention. Accordingly, the description which follows is to be understood as a broad teaching disclosure directed to persons of skill in the appropriate arts and not as limiting upon the present invention.

Figure 1:
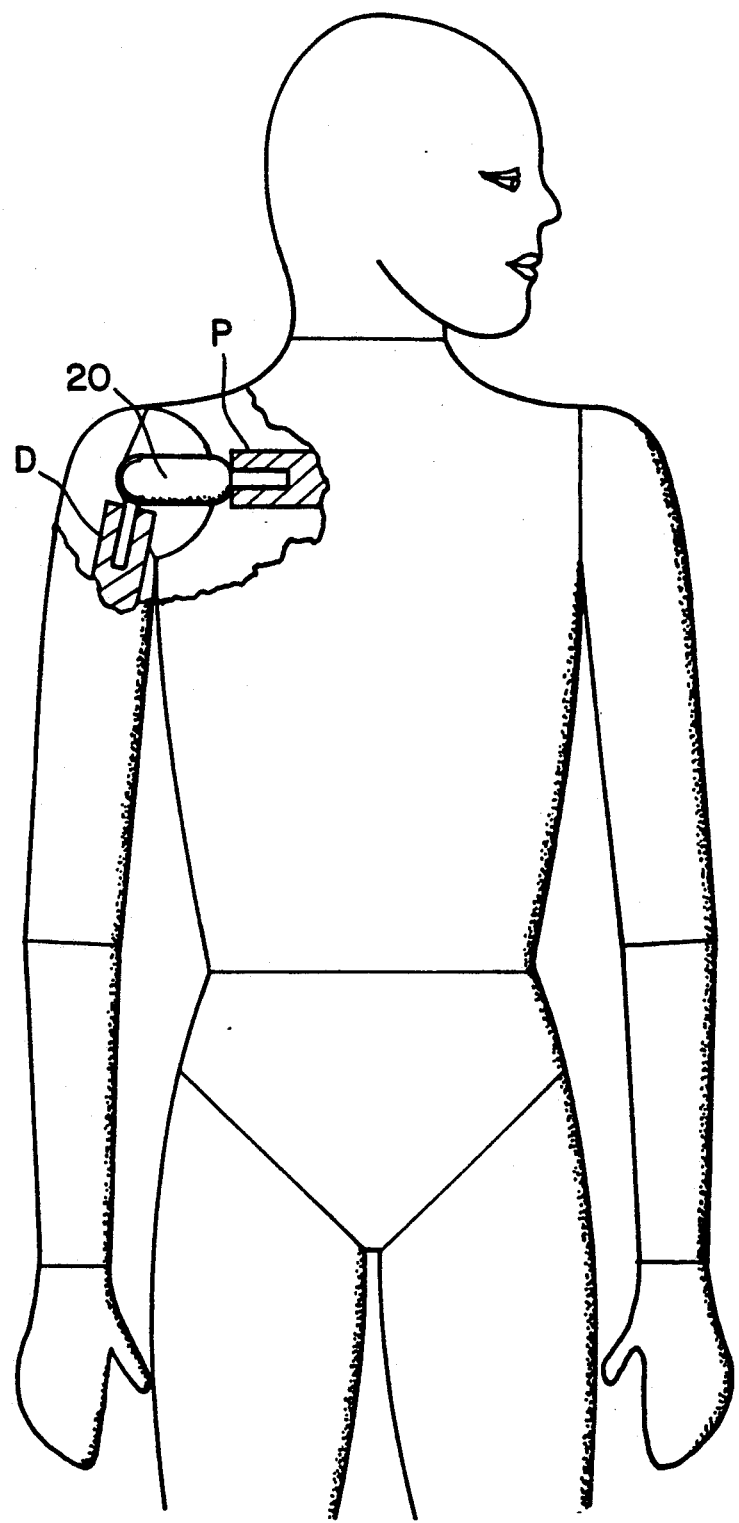

Referring more specifically to the drawings, and particularly to FIG. 1, a doll or mannequin incorporating the apparatus of the present invention is there illustrated. The right anatomical shoulder of the doll has been broken away and the particular doll illustrated includes an internal skeleton to which the apparatus is attached. The present apparatus may be employed to form various movable joints such as the wrist, elbow and shoulder (as shown in FIG. 2) as well as the ankle, knee and hip (not shown). Each of the aforementioned joints operates, insofar as the present invention is concerned, in an essentially identical manner. In order to facilitate a clear understanding of the invention and its embodiments, the operation of only one joint and its cooperating connecting apparatus will be discussed in detail. Also, it will be noted that each movable joint of the doll may be formed with the apparatus which is the subject of the present invention. In addition, the reader will note that the apparatus of the present invention may be employed to connect any two workpieces together and in the illustrated embodiment is used in conjunction with a doll having an internal skeleton. For the sake of clarity the description which follows will refer to a "doll", but it is intended that the invention cover the movable connection of any proximal and distal workpieces.

Figure 7:
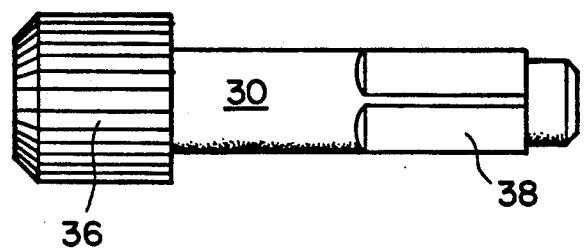
FIG. 7 is a side view of an alternate embodiment of the first positioning means used in the apparatus of the present invention.
Figure 8:
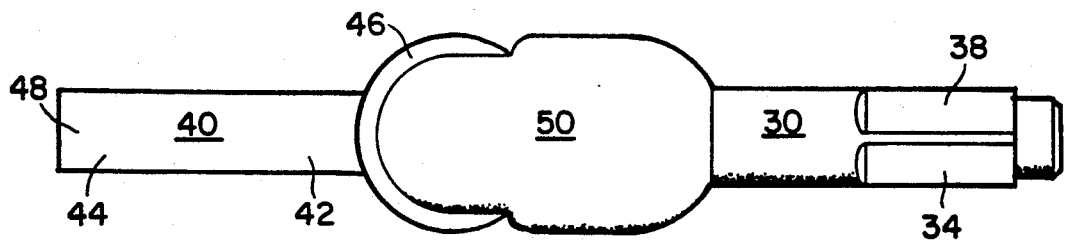
FIG. 8 is a side view of the apparatus of the present invention.
Figure 9:
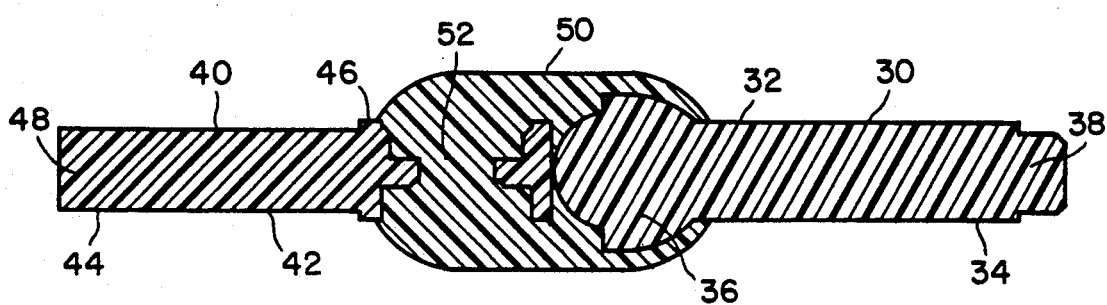
FIG. 9 is a side view, broken away of the apparatus of the present invention.
Figure 10:
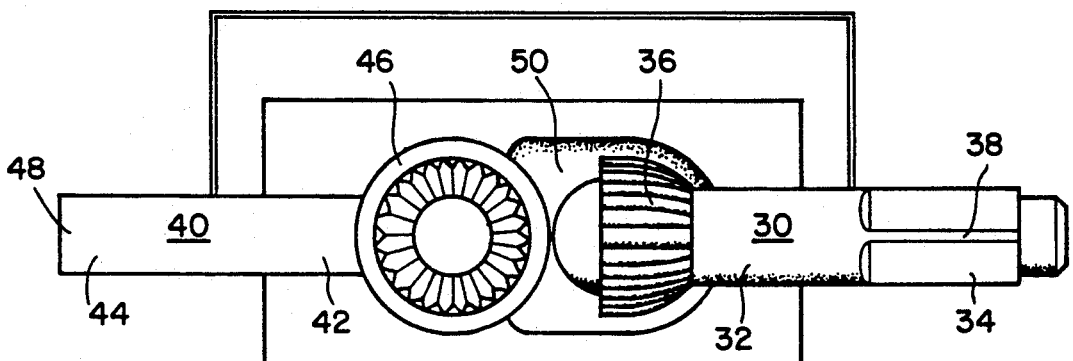
FIG. 10 is a plan view of the first positioning means and the second positioning means of the apparatus of the present invention connected together by a runner and resting in a mold.
Figure 11:
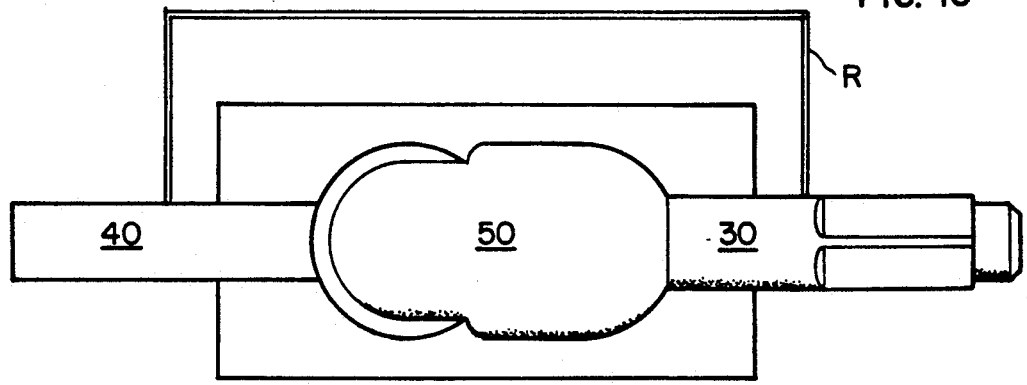
FIG. 11 is a plan view of the first positioning means and the second positioning means positioned in a mold connected together by a runner and showing the joint means formed therearound.

The apparatus of the present invention, generally indicated at 20 includes a first shank 30 having a first end 32 and a second end 34. A first positioning means or surface of revolution 36 is located proximate the first end 32 and a connecting means 38 adapted to be connected to a proximal workpiece P is located proximate the second end. In the illustrated embodiment, the first shank is cylindrical and is fabricated from any semi-rigid material such as plastics and the like. The first positioning means may take the form of any substantially symmetrical shape such as a cylinder (FIG. 7) or a sphere (FIGS. 9-10) wherein the axis of revolution is substantially coaxial with the first shank 30. Located proximate the second end is a connecting means 38. Near the second end, the connecting means 38 is contoured so as to attach without rotation or slippage to the proximal workpiece.

The apparatus also includes a second shank 40 having another first end 42 and another second end 44. A second positioning means 46 is located proximate the first end and a second connecting means adapted to be connected to the distal workpiece D is located proximate the another second end 44. In the illustrated embodiment, the second shank is square and is fabricated from any semi-rigid material such as plastics and the like. The second positioning means 46 illustrated is a toroid, but other similar shapes wherein the axis of revolution is substantially orthogonal to the second shank 40 may be employed with equal efficacy. Located proximate the another second end 44 is the second connecting means 48. Near the another second end 44, the second shank is tapered and is substantially square so as to fit without rotation or slippage within the distal workpiece D.

A joint means or joint 50 is provided for movably connecting the first positioning means and the second positioning means. The joint encapsulates the first positioning means 36 and the second positioning means 46 and forms substantially congruent surfaces therewith. More particularly, as is presently contemplated, during the manufacturing process, the first and second shanks 30,40, will be produced by molding and will be connected together via a runner R. The first and second positioning means 36,46 are then lubricated to prevent sticking and are positioned in a mold. The joint 50 is then formed by injecting an elastomer into the mold using conventional molding techniques and thus forms a socket of unitary construction. During the molding of the joint, a pin 52, integral with the joint, is formed within the opening of the toroid 46 as the liquid elastomer flows therethrough. The pin 52 serves to anchor the second positioning means 46 within the joint 50 (forming a surface of rotation) and to limit its motion so as to be angularly moveable with respect to the joint means. Nonetheless, when the free end of the first shank 34 is fixed, the free end of the second shank 44 is movable to substantially all the points of a hemisphere. Alternatively, the joint 50 may be formed without the pin 52 if the joint material is strong enough. When the joint is formed, the first positioning means and the second positioning means 36,46 are movably positioned so that the corresponding axes of revolution lie in perpendicular planes or as stated otherwise, are in orthogonal axes of rotation.

In the illustrated embodiment, the first positioning means 36 and the second positioning means 46 include a detent means or detent 60 for posably positioning the first and second shanks at any one of a plurality of preselected positions. The detent means 60 comprises a plurality of protuberances on at least a portion of the exterior surface of the first positioning means 36. Detent means also extend along at least one of the surfaces of the second positioning means 46. Thus, when the joint 50 is molded, the corresponding congruent surfaces will have a shape converse to that of the first and second positioning means and thus resistance to their movement will be provided.

Those skilled in the art of molding will recognize that the resistance can be varied by choice of material and detent shape. Thus, by including the detents as described above, the first and second shanks can be moved to a variety of discrete positions.

Figure 5:
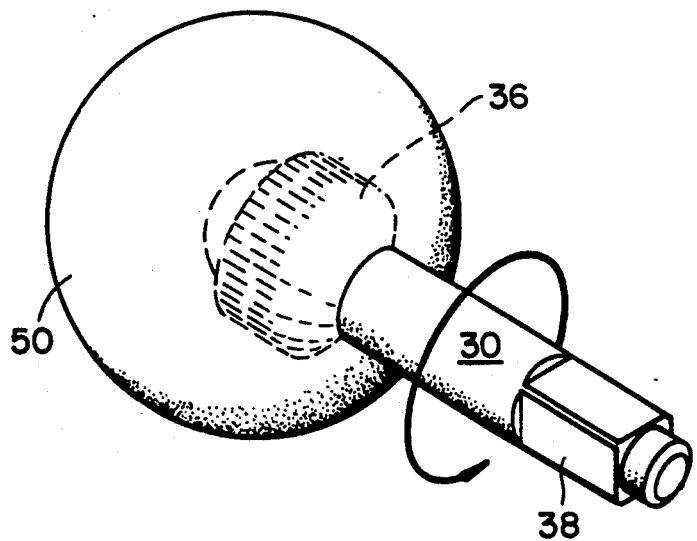
FIG. 5 is a perspective view of the apparatus of the present invention showing the first positioning means.
Figure 6:
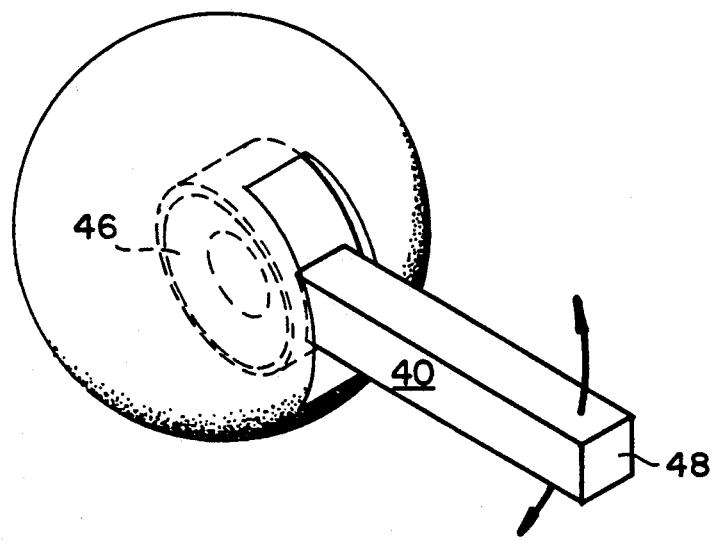
FIG. 6 is a perspective view of the apparatus of the present invention showing the second positioning means.

In operation, the free ends of the first and second shanks are connected by suitable means to respective proximal and distal workpieces, such as the limbs of a mannequin forming the shoulder joint (best shown in FIG. 1). Alternatively, the first and second positioning means could be formed so as to be integral with each end of an appendage (such as an arm, leg, etc.) so that when a joint is formed, appendages will be connected together using a single process step. When it is desired to pose the mannequin, the limbs can be manipulated so that the shoulder joint is movable to virtually every position that might be assumed by a human being. It will be noted that the present invention is not linked to human figures, but that the joint may be applied with equal efficacy to robots, animal figures and the like. In addition, the apparatus may be modified by separately encapsulating either the first or second positioning means within the joint to obtain a hinge action when the position of the joint is fixed as shown in FIGS. 5 and 6.

The foregoing embodiments and examples are to be considered illustrative, rather than restrictive of the invention, and those modifications which come within the meaning and range of equivalence of the claims are to be included therein.

That which is claimed is:

1. An apparatus for movably connecting proximal and distal workpieces, such as the end portions of elongate limbs of a doll or mannequin and comprising:

a first shank having a first end and a second end and including a first positioning means comprising a surface of revolution proximate said first end and said second end adapted to be connected to the proximal workpiece, a second shank having another first end and another second end and including a second positioning means comprising a surface of rotation proximate said another first end and said another second end adapted to be connected to the distal workpiece, and a molded elongate elastomer joint means for movable connecting said first positioning means and said second positioning means, said joint means forming a socket of unitary construction supporting for movement said first and second positioning means, said first positioning means being adapted for rotational movement about the longitudinal axis of said joint means and said second positioning means being angularly movable with respect to the longitudinal axis of said joint means and being anchored therein by a flexible pin integrally formed with said joint means, whereby the first and second workpieces are easily movable to a wide variety of positions.

2. An apparatus according to claim 1 wherein said joint means substantially encapsulates said first and second positioning means.

3. An apparatus according to claim 1 wherein said joint means forms a substantially congruent surface with said first and second positioning means.

4. An apparatus according to claim 1 wherein said joint means is formed by molding.

5. An apparatus according to claim 3 wherein said first positioning means and said substantially congruent surface of said joint means include a detent means for posably positioning said second shank at any one of a plurality of preselected positions.

6. An apparatus according to claim 4 wherein said second positioning means comprises a toroid including an opening therein and wherein said molded joint means forms a pin in the opening of said toroid during molding that retains said second positioning means within said joint means.

7. An apparatus according to claim 3 wherein said second positioning means and said substantially congruent surface of said joint means include a detent means for posably positioning said first shank at any one of a plurality of preselected positions.

8. An apparatus for movably connecting proximal and distal workpieces, such as the end portions of elongate limbs of a doll, mannequin and comprising:
- a first shank having a first end and a second end and including a first positioning means comprising a surface of revolution proximate said first end and said second end adapted to be connected to the proximal workpiece,
- a second shank having another first end and another second end and including a second positioning means comprising a surface of rotation proximate said another first end and said another second end adapted to be connected to the distal workpiece,
- a molded elongate elastomer joint means for movably connecting said first positioning means and said second positioning means, said joint means substantially encapsulating and forming a substantially congruent surface with said first positioning means and said second positioning means, said joint means further forming a socket of unitary construction supporting for movement said first positioning means and said second positioning means, said first positioning means being adapted for rotational movement about the longitudinal axis of said joint means and said second positioning means being angularly movable with respect to the longitudinal axis of said joint means and being anchored therein by a flexible pin integrally formed with said joint means, whereby when the ends of the proximal and distal workpieces are connected to said joint means and the free end of the proximal workpiece is fixed, the free end of the distal workpiece is movable to substantially all the points of a hemisphere.

9. An apparatus according to claim 8 wherein said first positioning means and said corresponding congruent surface of said joint means include a detent means for posably positioning the second shank at any one of a plurality of positions.

10. An apparatus according to claim 8 wherein said second positioning means and said substantially congruent surface of said joint means include a detent means for posably positioning the first shank at any one of a plurality of preselected positions.

11. An apparatus according to claim 8 wherein said first positioning means and said second positioning means and said substantially congruent surfaces of said joint means include a detent means for posably positioning said respective first and second shanks, whereby when the first and second shanks are connected to the proximal and distal workpieces, the workpieces may be posed at any one of a plurality of preselected positions.

* * * * *